United States Patent
Amann et al.

[11] 3,893,292
[45] July 8, 1975

[54] POWER TURBINE DECELERATION CONTROL

[75] Inventors: Charles A. Amann, Bloomfield Hills; Sidney G. Liddle, Sterling Heights, both of Mich.

[73] Assignee: General Motors Corporation, Detroit, Mich.

[22] Filed: Aug. 6, 1973

[21] Appl. No.: 385,951

[52] U.S. Cl. .......................... 60/39.27; 60/39.29
[51] Int. Cl. ............................................. F02c 9/08
[58] Field of Search............... 60/39.23, 39.27, 39.29

[56] References Cited
UNITED STATES PATENTS

| | | | |
|---|---|---|---|
| 2,977,757 | 4/1961 | Mock | 60/39.23 X |
| 3,255,586 | 6/1966 | Hennig | 60/39.27 X |
| 3,418,806 | 12/1968 | Wagner | 60/39.29 X |
| 3,638,422 | 1/1972 | Loft | 60/39.28 |
| 3,691,762 | 9/1972 | Ryberg | 60/39.23 X |
| 3,710,576 | 1/1973 | Evans | 60/39.27 X |
| 3,795,104 | 3/1974 | McLean | 60/39.27 |

FOREIGN PATENTS OR APPLICATIONS

| | | | |
|---|---|---|---|
| 525,550 | 8/1940 | United Kingdom | 60/39.23 |
| 657,445 | 9/1951 | United Kingdom | 60/39.27 |

*Primary Examiner*—Clarence R. Gordon
*Attorney, Agent, or Firm*—Paul Fitzpatrick

[57] ABSTRACT

A gas turbine engine connected to drive a motor vehicle includes valving to by-pass the regenerator of the engine when it is desired to decelerate the vehicle so that heat stored in the regenerator is not effective to provide positive power output from the turbine. The cold gas path of the heat exchanger only may be by-passed; or, compressed air may be diverted to atmosphere, by-passing the combustion apparatus, turbine and the entire heat exchanger. Opening of the by-pass is responsive to a request for zero or idling power output from the engine and to turbine rpm above a particular level.

4 Claims, 5 Drawing Figures

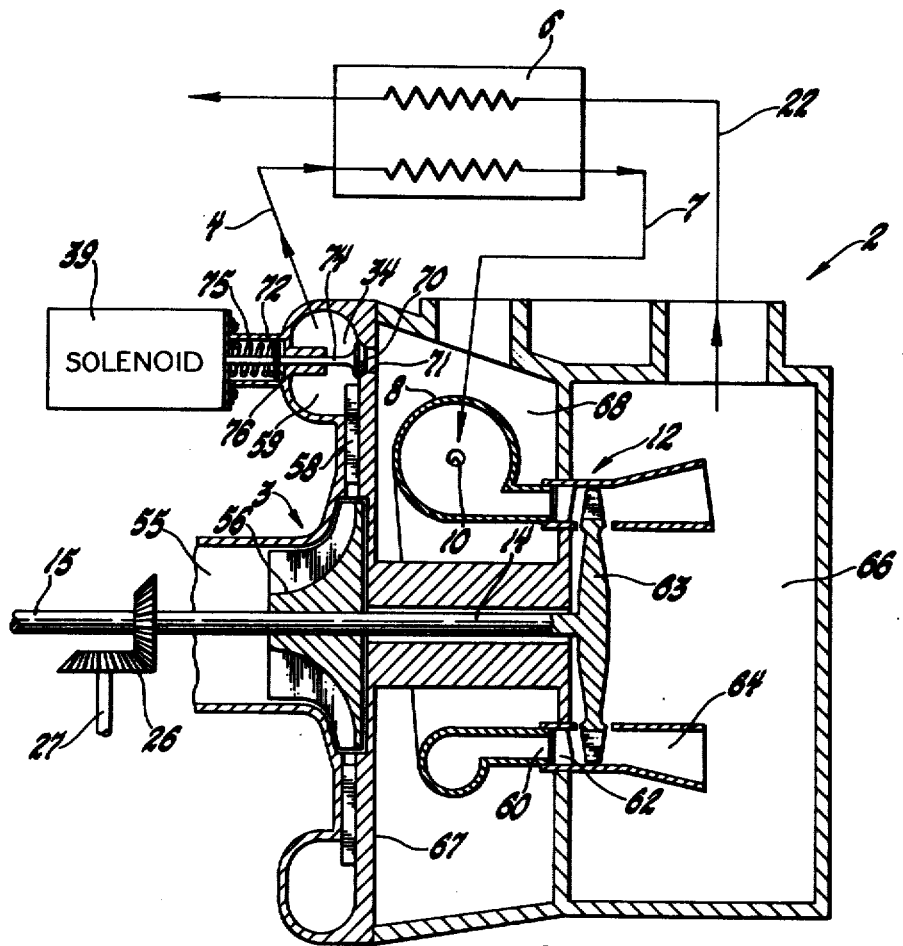
Fig.2
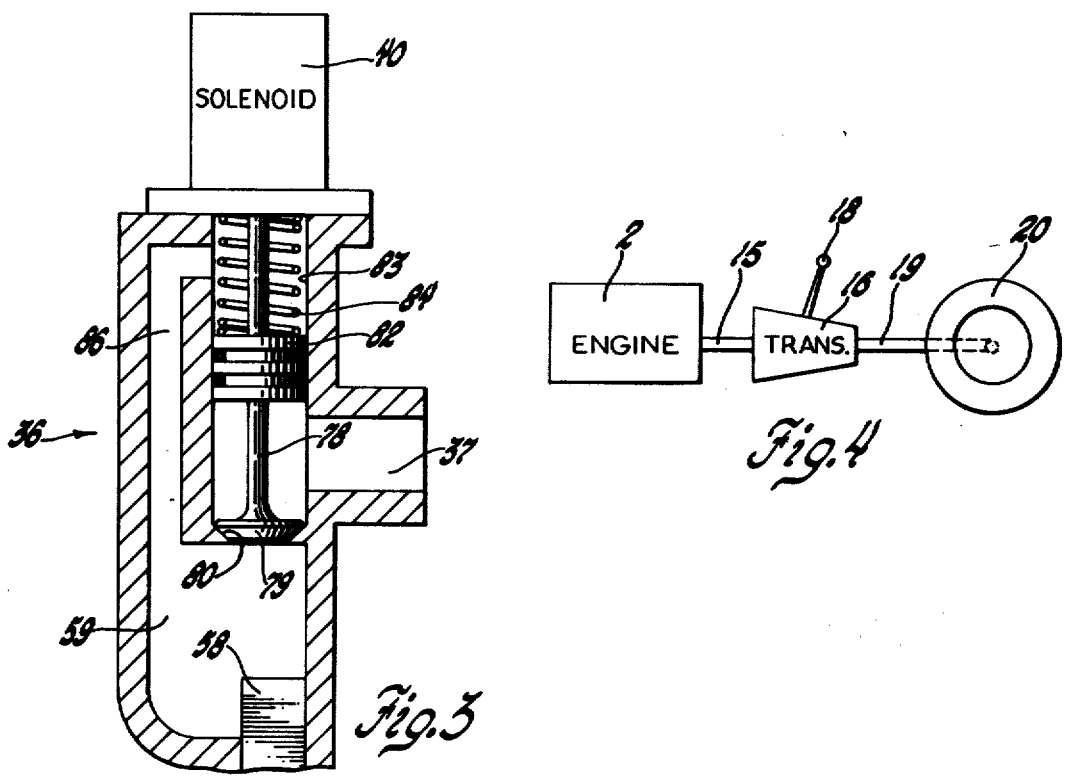
Fig.3
Fig.4

POWER TURBINE DECELERATION CONTROL

Our invention relates to gas turbine engines, and particularly to improving the characteristics of regenerative gas turbine engines employed for propelling vehicles. More specifically, our invention is directed to reducing the lag in deceleration to such engines occasioned by delivery of heat from the regenerator to the gases flowing to the turbine.

A typical gas turbine engine for vehicle propulsion may include a compressor, a combustion apparatus supplied with air by the compressor, and a turbine connected to drive the compressor. Either this turbine is connected to drive the vehicle through a suitable transmission, or a second turbine, ordinarily energized from the exhaust of the first turbine, is so connected. These types of engines are referred to as single shaft and gas-coupled, respectively. With the single shaft engine, the power output shaft of the engine is connected to the compressor and therefore, if no fuel is supplied to the engine, the compressor is capable of exerting a very substantial braking torque on the vehicle wheels. With the gas-coupled engine, ordinarily the power turbine may turn independently of the compressor; however, if the engine includes some means to couple the power turbine to the compressor as, for example, the power transfer system disclosed in Flanigan, et al., U.S. Pat. No. 3,237,404, Mar. 1, 1966, the power output shaft may be braked by the compressor.

For reasons of economy, it appears to be essential to provide a heat exchanger to recover heat from the turbine exhaust and transfer it to the air flowing from the compressor into the combustion apparatus. Such devices are called regenerators or recuperators. They may involve either fixed or rotary heat exchangers. In either case, ordinarily the metal of the heat exchanger is capable of storing a great deal of heat. As a result, if fuel is shut off to cause the engine to decelerate, the heat stored in the regenerator continues to heat the air flowing from the compressor to the turbine so that the engine continues to deliver a positive amount of power until considerable cooling of the regenerator has occurred. In the future discussion, the heat exchanger will be referred to as a regenerator and it is to be understood that the term is intended to be generic to fixed and rotary heat exchangers.

The basic idea of our invention is to provide means to by-pass the regenerator when it is desired to decelerate the engine and cease to transmit power to drive the vehicle, and thus to improve the deceleration or coast-down characteristics of the vehicle powered by our engine. This may be effected by by-passing only the cold gas path of the heat exchanger under suitable control. Alternatively, one may discharge air from the compressor directly to the atmosphere or to the atmosphere through a silencer, thus by-passing the entire engine except for the compressor so far as the by-passed air is concerned.

The nature of our invention and its advantages will be clear to those skilled in the art from the succeeding detailed description of preferred embodiments of the invention and the accompanying drawings.

FIG. 2 is a quasi-schematic illustration of a gas turbine engine and regenerator.

FIG. 3 is a sectional view of a by-pass control valve.

FIG. 4 is a schematic diagram of a gas turbine vehicle power plant installation.

Figure 1:
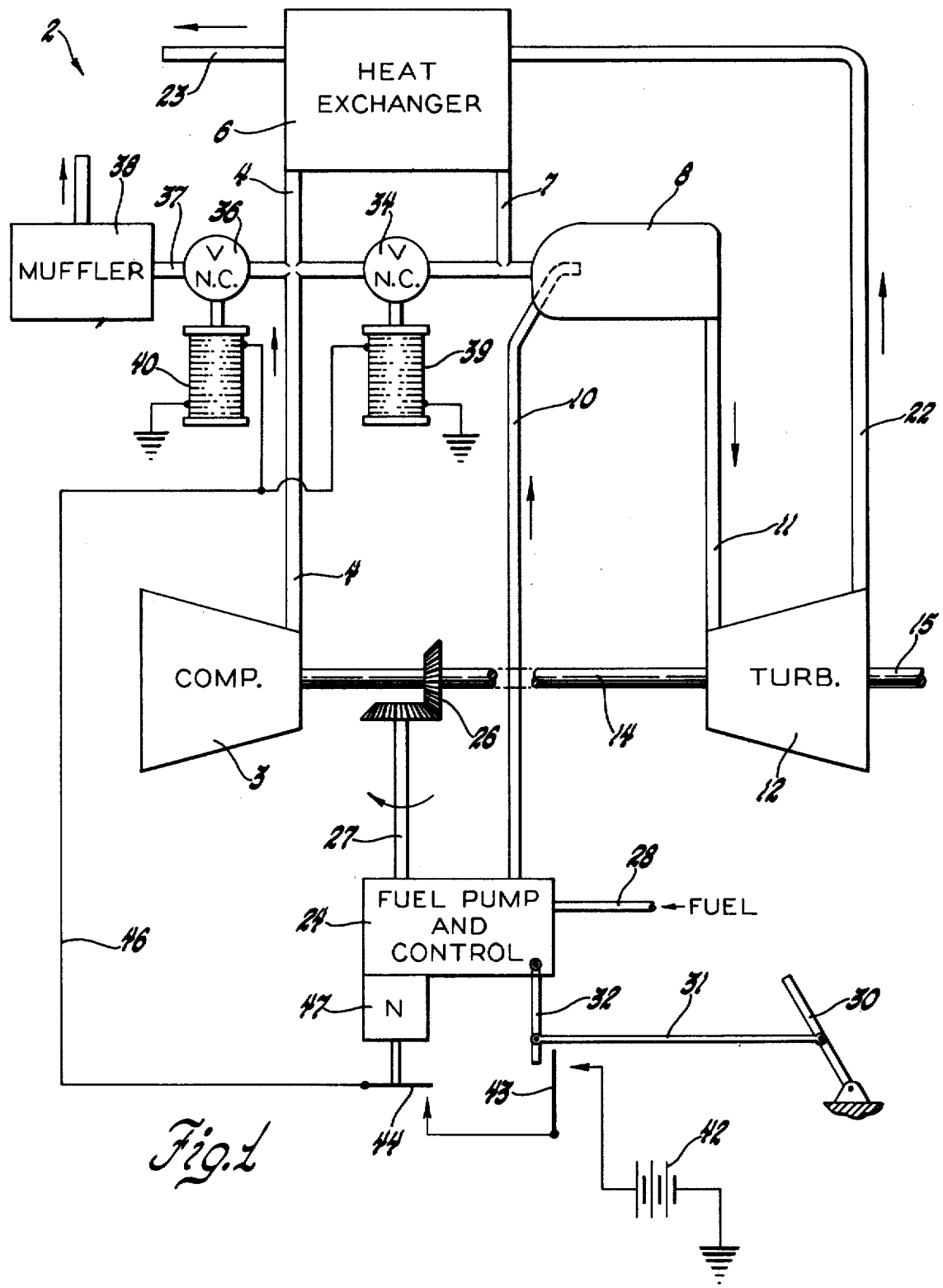
FIG. 1 is a schematic diagram of a gas turbine power plant and control.

Referring first to FIG. 1, the shaft power out-put gas turbine power plant 2 includes a rotary compressor 3 which delivers air through ducting 4, the compressed air path of a regenerator 6, and ducting 7 to a combustion apparatus 8. Fuel is supplied to the combustion apparatus through a fuel line 10. The fuel is ignited and burned, and the resulting combustion products are delivered through ducting 11 to a turbine 12. Turbine 12 is connected through a shaft 14 to drive the compressor. Preferably, the turbine 12 is a single shaft type and drives also a power output shaft 15, which is thus directly connected to the compressor 3. However, the turbine 12 may include independently rotatable high and low pressure turbines, with the high pressure turbine connected to shaft 14 and low pressure turbine connected to shaft 15 as long as means are provided to couple shaft 15 to shaft 14 when it is desired to decelerate the vehicle. As shown in FIG. 4, the engine 2 is connected through shaft 15 to a suitable power transmission 16 which may include some operable control means 18. The transmission in turn drives a propeller shaft 19 which may be connected through the usual differential gearing to the driving wheels 20 of a motor vehicle.

The transmission may be of any suitable type; there are many disclosures of transmissions for such installations. It may be of an infinitely variable type or a step ratio type and may or may not include a hydraulic torque converter. Ordinarily, the transmission may vary over a range of ratios for forward operation of the vehicle and to transmit power from the wheel 20 to the engine 2 when the vehicle tends to overrun the engine.

Referring again to FIG 1, the exhaust gas discharged through turbine 12 is directed through ducting 22, the hot gas path of the regenerator 6, and an exhaust pipe 23 to atmosphere. In operation, the turbine drives the compressor which delivers air at a substantial temperature as a result of compression to the heat exchanger which further heats the air. Burning of fuel in the heated air in combustion apparatus 8 provides quite hot motive fluid for the turbine, which is cooled to some extent by expansion and upon flowing through the regenerator loses much of its heat to the compressed air.

Control of operation of the engine is primarily by control of the supply of fuel through line 10 to the combustion apparatus. This may be accomplished by a fuel pump and control assembly 24 which includes a fuel pump driven through gears 26 and accessory shaft 27 from the engine shaft 14. Fuel is supplied from a suitable source such as a boost pump through line 28 to the fuel pump. The control operates as directed by an operator-operable control input device such as the accelerator pedal 30. The pedal may be connected by transmission means indicated by the link 31 and arm 32 to the fuel control to vary the amount of fuel supplied to the engine. As is well known, such fuel controls may include temperature and speed controls and means to prevent overfueling of the engine which are immaterial to our present invention. The function of pedal 30 is to vary fuel supplied to the engine from a low value to the maximum usable by the engine. The low value ordinarily may be entire shutoff of fuel or it may be an amount of fuel sufficient to maintain combustion but provide relatively little heat so that the engine is not capable of delivering any significant shaft power.

The engine and controls so far described may be considered to be typical of prior art vehicle turbine installations upon which our invention is an improvement. The improvement may be embodied in valve means 34 indicated schematically in FIG. 1 as a normally closed valve which by-passes the compressed air path of the regenerator, interconnecting ducts 4 and 7. It may also be embodied in valve means 36 indicated as a normally closed valve allowing air to bleed off from compressor discharge ducting 4 through a conduit 37 and muffler 38 to the atmosphere. The valve means 34 and 36 may be of various types and may involve plural valves connected in parallel. Either valve means 34 or 36 may be provided, or both. Both are illustrated, but it is clear that one might be omitted.

Normally closed valve 34 is opened by energizing a solenoid 39 and normally controlled valve 36 is opened by energizing a solenoid 40. These are energizable by circuits from a source of current indicated as the vehicle battery 42 through a normally open throttle position switch 43 and an engine speed responsive switch 44, a lead 46, and the solenoid 39 or 40, or both, to ground. As illustrated, the throttle position switch is open during normal operation of the engine; it is closed when the accelerator pedal 30 is released by arm 32, which swings to the right as illustrated to close the switch. Speed switch 44 is operated by a speed sensor 47 which may be attached to the fuel pump and control or may be anywhere in the engine, and which closes switch 44 when turbine 12 and shaft 14 are turning above a predetermined idling speed level. Other indicia of speed such as compressor discharge pressure may be used if desired to actuate switch 44.

Figure 5:
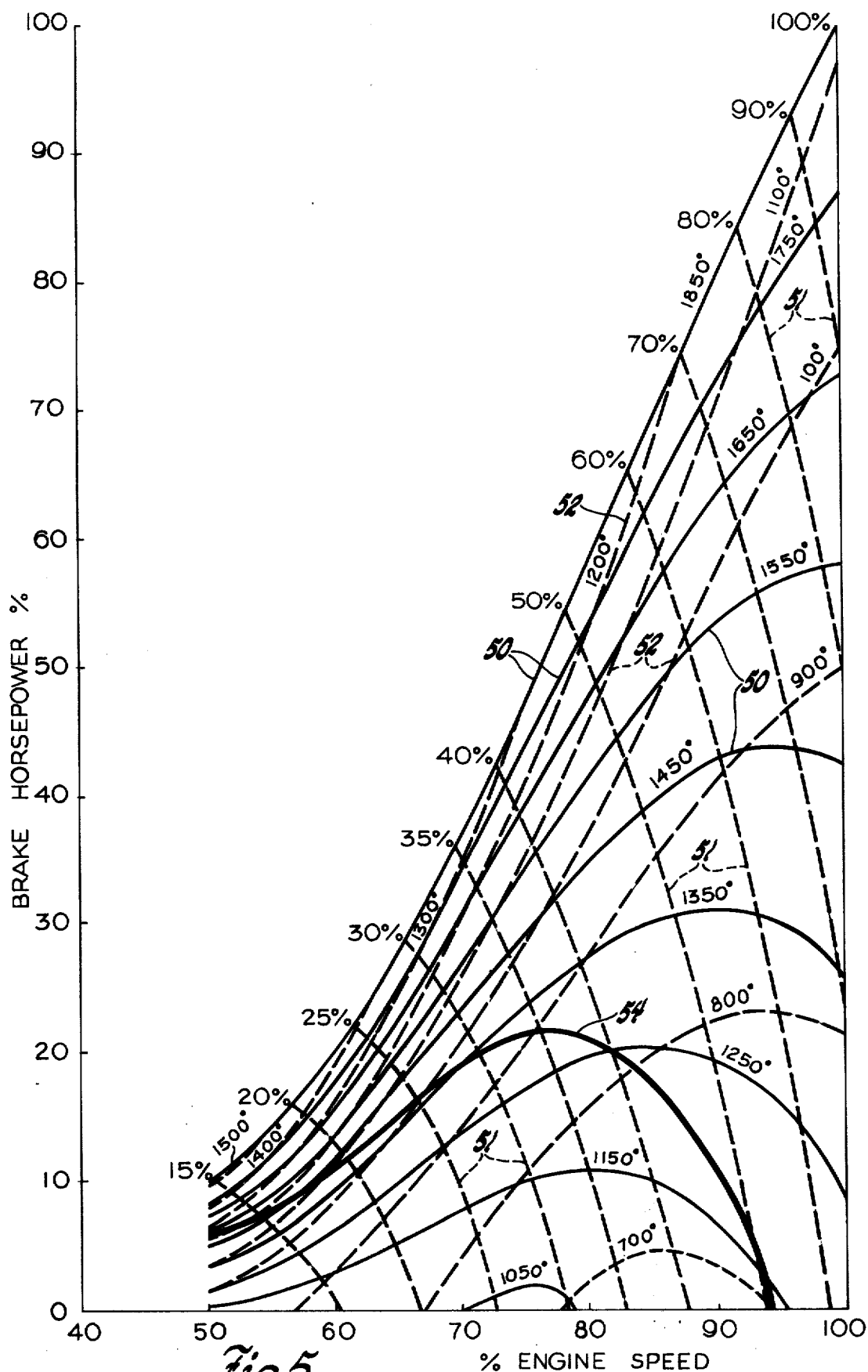
FIG. 5 is a set of curves illustrating operating characteristics of a typical regenerative single-shaft gas turbine engine.

An understanding of the rationale of our invention may be aided by reference to FIG. 5 which is a plot of engine brake horsepower as percent of full power against engine speed as a percentage of full rated speed over the range from 50% to 100%; 50% may be regarded as idling operation. The curves are for standard ambient atmospheric conditions, but are typical of all normal atmospheric conditions. For any given engine speed, the power output is a function of turbine inlet temperature. The set of curves identified by the numeral 50 are curves of constant turbine inlet temperature with the outermost curve at maximumm allowable turbine inlet temperature, which is 1,850°F. in the particular example. Others of this set of curves represent temperatures at intervals of 100° down to 1,050°F. The set of broken lines identified as 51 are lines representing constant fuel supply, fuel ranging from the lowest curve of 15% of maximum up to 100% at maximum speed, temperature, and power output. The upwardly trending dashed lines identified as 52 are curves of constant burner inlet temperature for the same engine. These also are at increments of 100°, with the lowest curve being 700° and the maximum being 1,500.

Now, we may assume that 20% of full engine rated power is required to drive a particular vehicle at a particular steady speed on a level road. If we follow the horizontal line of 20% power, it is seen that this amount of power can be produced at any engine speed from 60% to 100%. Observing the manner in which the constant fuel flow lines cross this horizontal power output line, it is seen that the required power is produced with the least fuel flow at the highest turbine inlet temperature. Thus, for best vehicle fuel economy, 20% power should be developed at 60% speed with a turbine inlet temperature of 1,850°F. The corresponding burner inlet temperature is approximately 1,450°F. Now, if the vehicle is to be coasted to a lower speed, the driver removes his foot from the accelerator pedal. In the particular example, this shuts off the flow of fuel to the burner entirely. The temperature of the gas flowing from the burner immediately drops to the burner inlet temperature level, since no temperature rise occurs in the burner. Power thus drops to a level corresponding to a turbine inlet temperature of approximately 1,450°F.

The line 54 in FIG. 5 represents the burner inlet temperature corresponding to operation along the 1,850° turbine inlet temperature line for various levels of engine operation. Thus, for example, if the engine is operating at 50% maximum power with 1,850° turbine inlet temperature and fuel is shut off, turbine inlet temperature will drop to approximately 900°F. as indicated near the summit of curve 54. It will be seen that the engine power output under this condition drops from 50% to about 21%, which is the amount of power required to drive the vehicle in the earlier example. In the prior example, cutting off fuel when operating at 20% power and 1,850°F. turbine inlet temperature results in an immediate drop only to about 11% maximum power, still a considerable amount of power.

Continued rotation of the engine forcing air through the regenerator gradually cools the regenerator and thus the power output drops with time from that indicated by line 54. The slow decay of power from a significant level to zero or negative is undesirable in term of passenger vehicle operation, particularly. The effect would be much as would be experienced with an ordinary reciprocating engine if the accelerator pedal should stop part way closed and then gradually close, rather than return immediately to the minimum fuel position.

If the compressed air is caused to by-pass the regenerator by the opening of valve means 34 in FIG. 1, the air is no longer heated by the energy stored in the regenerator and it drops to compressor outlet temperature, which is much lower. With no heat contributed to the compressed air, the engine will absorb power, since the air will provide less power output from the turbine than is required to compress it. There is, of course, considerable recovery of energy of compression in the turbine.

For this reason, there are advantages in bypassing the air by valve means 36 which by-pass the entire engine, since in this case there is no power recovery by the turbine from the compressed air. The disadvantage of the bleed to atmosphere is that a muffler will likely be required, since the exhaust of compressed air to the atmosphere would otherwise be quite noisy. If the air is routed through the turbine and heat exchanger, the sound level is low.

It may be pointed out also that, to the extent the by-pass reduces cooling of the regenerator during an interval of engine shutdown, it contributes to the overall efficiency of the power plant. Heat which remains stored in the regenerator is usable when normal power output is resumed. If the regenerator is cooled by air blowing through it as the vehicle coasts, the heat is simply wasted to atmosphere.

By-passing only the compressed air path of the regenerator is not particularly effective in reducing regenerator cooling, since the air exhausted from the turbine under the condition of no fuel supply will be relatively cool and will have a substantial cooling effect on the regenerator. If the entire engine is by-passed, however, the heat loss of the regenerator will be quite slow and most of the heat present in the regenerator at the time engine power is shut off may be later recovered if there is a power interruption of short duration.

FIG. 2 shows in somewhat more structural manner an engine incorporating regenerator by-pass valving 34 as in FIG. 1. The parts corresponding to FIG. 1 are numbered as in that figure. It will be noted that the power output shaft 15 in this case is shown as a continuation of the turbine-compressor shaft 14. In this structure, air induced into an air entrance 55 is pumped by the compressor rotor 56 between diffusing vanes 58 into a plenum 59 corresponding to the initial portion of ducting 4 in FIG. 1. Air then flows through ducting 4, regenerator 6, and ducting 7 to the combustion apparatus 8 which in this case is at right angles to the compressor-turbine axis. The combustion apparatus discharges through outlet 60 and turbine nozzle 62 to drive a turbine wheel 63 fixed to shaft 14. The turbine discharges through an annular exhaust diffuser 64 into an exhaust plenum 66 from which the exhaust products flow through ducting 22 and the hot gas path regenerator 6 to exhaust. Back wall 67 of the compressor divides the compressor from a space 68 normally filled with air heated by the regenerator which flows into the combustion apparatus 8. To by-pass the regenerator, the valve 34 or a number of valves 34, disposed around the axis of the compressor, may be provided. Each valve 34 comprises a poppet 70 which normally closes a seat defined by hole 71 through the wall 67. The valve actuating solenoid 39 is fixed to an annular boss 72 extending from the forward wall of the plenum chamber 59. Valve poppet 70 is actuated by a stem 74 extending into the solenoid and is biased to close by a light spring 75 bearing against the solenoid and against a flange 76 on the stem. Because of the pressure drop through the regenerator, there is a natural tendency for the valve 34 to remain closed, but the spring 75 is desirable to retain the valve closed when the engine is shut down or starting, for example, and there is no significant pressure differential. Upon energizing the solenoid 39 as has been explained, the valve is drawn open to allow air to flow through the openings 71 and thus by-pass the regenerator. Ordinarily, the greater part of the air will by-pass the regenerator and the small amount flowing through the regenerator is of no great consequence. It is possible, of course, to arrange valving in line 4 between plenum 59 and the regenerator or in line 7 between the regenerator and the combustion apparatus to completely block flow through the regenerator. Such valving could be actuated simultaneously with the valve 34.

FIG. 3 illustrates a form of valve which may well be employed for by-passing the regenerator and, as illustrated, is specifically contemplated as the valve 36 to by-pass compressed air into the conduit 37 leading to atmosphere, preferably through a muffler. This valve is generally similar to the valve 34 illustrated in FIG. 2 but embodies a pressure balance feature. As shown, the valve has a stem 78 actuated by the solenoid 40 which bears a head or poppet 79 engaging a seat at an outlet 80 from the compressed air plenum 59. A balance piston 82 approximately equal in area to the head 79 is fixed to stem 78 and is reciprocable in a cylinder 83. A compression spring 84 exerts a force tending to seat the valve. A passage 86 leads compressor discharge pressure to the interior of cylinder 83 above the piston 82 so that the pressure on the piston is substantially balanced, with a slight overbalance tending to hold the valve closed. When the solenoid is energized to open the valve 36, the pressure level against the underside of the piston 82 remains approximately equal to that on the upper side and thus no great force is required to open the valve or hold it open. However, balance of forces is such that the valve will close if the solenoid is deenergized.

It should be clear from the foregoing to those skilled in the art that we have devised a system to improve the deceleration characteristics of gas turbines and to conserve heat in the regenerator during temporary conditions during which fuel is shut off, or substantially so.

The detailed description of the preferred embodiment of the invention for the purpose of explaining the principles thereof is not to be considered as limiting or restricting the invention, since many modifications may be made by the exercise of skill in the art.

We claim:

1. A shaft power output gas turbine power plant comprising a compressor, combustion apparatus supplied with air by the compressor, a power output shaft, a turbine energized by the combustion apparatus connected to drive the compressor and to drive or be driven by the output shaft, a regenerator having substantial heat storage capacity normally connected to transfer heat from the turbine exhaust gas to the air flowing through a compressed air path from the compressor to the combustion apparatus, means for supplying fuel to the combustion apparatus, and operator-controllable power level control means regulating the fuel supplying means; in combination with means for reducing power output of the engine upon cutback in fuel supply including normally closed valve means connected to the outlet of the compressor effective upon opening of the valve means to divert a major portion of the air discharged from the compressor from flowing through the regenerator compressed air path; and control means responsive to the power level control means and to turbine speed effective to open the valve means at all times when the conditions that an idling power level is called for by the power level control and that turbine speed is above a predetermined idling speed level are both met and to close the valve means under all other conditions.

2. A shaft power output gas turbine power plant comprising a compressor, combustion apparatus supplied with air by the compressor, a power output shaft, a turbine energized by the combustion apparatus connected to drive the compressor and to drive or be driven by the output shaft, a regenerator having substantial heat storage capacity normally connected to transfer heat from the turbine exhaust gas to the air flowing through a compressed air path from the compressor to the combustion apparatus, means for supplying fuel to the combustion apparatus, and operator-controllable power level control means regulating the fuel supplying means; in combination with means for reducing power output of the engine upon cutback in fuel supply including normally closed valve means connected to the outlet of the compressor effective upon opening the valve means to divert a major portion of the air discharged from the compressor from flowing through the regenerator compressed air path; and control means responsive to the power level control means and to turbine speed effective to open the valve means at all times when the conditions that an idling power level is called for by the power level control and that turbine speed is above a predetermined idling speed level are both met and to close the valve means under all other conditions; the said valve means being connected to by-pass the regenerator compressed air path and deliver the air into the circuit through the combustion apparatus, turbine, and the exhaust gas path of the regenerator.

3. A shaft power output gas turbine power plant comprising a compressor, combustion apparatus supplied with air by the compressor, a power output shaft, a turbine energized by the combustion apparatus connected to drive the compressor and to drive or be driven by the output shaft, a regenerator having substantial heat storage capacity normally connected to transfer heat from the turbine exhaust gas to the air flowing through a compressed air path from the compressor to the combustion apparatus, means for supplying fuel to the combustion apparatus, and operator-controllable power level control means regulating the fuel supplying means; in combination with means for reducing power output of the engine upon cutback in fuel supply including normally closed valve means connected to the outlet of the compressor effective upon opening the valve means to divert a major portion of the air discharged from the compressor from flowing through the regenerator; and control means responsive to the power level control means and to turbine speed effective to open the valve means at all times when the conditions that an idling power level is called for by the power level control and that turbine speed is above a predetermined idling speed level are both met and to close the valve means under all other conditions; the said valve means being connected to by-pass the regenerator compressed air path, the combustion apparatus, the turbine, and the regenerator exhaust gas path.

4. A shaft power output turbine power plant comprising a compressor, combustion apparatus supplied with air by the compressor, a power output shaft, a turbine energized by the combustion apparatus connected to drive the compressor and to drive or be driven by the output shaft, a regenerator having substantial heat storage capacity normally connected to transfer heat from the turbine exhaust gas to the air flowing through a compressed air path from the compressor to the combustion apparatus, means for supplying fuel to the combustion apparatus, and operator-controllable power level control means regulating the fuel supplying means; in combination with means for reducing power output of the engine upon cutback in fuel supply including normally closed valve means connected to the outlet of the compressor effective upon opening the valve means to divert a major portion of the air discharged from the compressor from flowing through the regenerator; and control means responsive to the power level control means and to turbine speed effective to open the valve means at all times when the conditions that an idling power level is called for by the power level control and that turbine speed in above a predetermined idling speed level are both met and to close the valve means under all other conditions; the said valve means being connected to by-pass the regenerator compressed air path, the combustion apparatus, the turbine, and the regenerator exhaust gas path; the power plant also including a muffler connected to conduct only the by-passed air to atmosphere.

* * * * *